United States Patent
Sako

(10) Patent No.: US 9,013,745 B2
(45) Date of Patent: Apr. 21, 2015

(54) COMMUNICATION APPARATUS, METHOD OF CONTROLLING THE SAME AND STORAGE MEDIUM

(71) Applicant: Canon Kabushiki Kaisha, Tokyo (JP)

(72) Inventor: Ritsuto Sako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/183,722

(22) Filed: Feb. 19, 2014

(65) Prior Publication Data

US 2014/0268221 A1   Sep. 18, 2014

(30) Foreign Application Priority Data

Mar. 14, 2013   (JP) .................................. 2013-052430

(51) Int. Cl.
*G06F 3/12* (2006.01)
*G06K 15/00* (2006.01)
*H04N 1/32* (2006.01)
*H04N 1/00* (2006.01)

(52) U.S. Cl.
CPC ........ *H04N 1/00204* (2013.01); *G06K 15/4045* (2013.01)

(58) Field of Classification Search
None
See application file for complete search history.

(56) References Cited

U.S. PATENT DOCUMENTS

| | | | |
|---|---|---|---|
| 8,400,530 B2 * | 3/2013 | Ikeda et al. | 348/231.99 |
| 8,627,075 B2 * | 1/2014 | Ikeda et al. | 713/168 |
| 8,638,459 B2 * | 1/2014 | Park | 358/1.15 |
| 8,692,905 B2 * | 4/2014 | Ikeda et al. | 348/231.99 |
| 2011/0156879 A1 * | 6/2011 | Matsushita et al. | 340/10.1 |
| 2011/0312278 A1 * | 12/2011 | Matsushita et al. | 455/66.1 |
| 2013/0057908 A1 * | 3/2013 | Park | 358/1.15 |
| 2014/0009786 A1 | 1/2014 | Sako | 358/1.15 |
| 2014/0105397 A1 * | 4/2014 | Ikeda et al. | 380/270 |
| 2014/0146336 A1 * | 5/2014 | Yagi | 358/1.13 |
| 2014/0152856 A1 * | 6/2014 | Ikeda et al. | 348/207.1 |

FOREIGN PATENT DOCUMENTS

JP   2011-160463 A   8/2011

* cited by examiner

*Primary Examiner* — Satwant Singh
(74) *Attorney, Agent, or Firm* — Fitzpatrick, Cella, Harper & Scinto

(57) ABSTRACT

A communication apparatus operable to perform communication with a communication terminal, and a method of controlling the apparatus. When a transmission is instructed, whether or not communication in a wireless communication mode for communicating wirelessly with a communication terminal, either the communication terminal or the communication apparatus having become an access point, is in process is determined. In a case that it is determined that communication in the wireless communication mode is in progress, an address of the transmission is set to a partner of the communication that is in progress by making a use of an address book invalid.

19 Claims, 6 Drawing Sheets

COMMUNICATION APPARATUS, METHOD OF CONTROLLING THE SAME AND STORAGE MEDIUM

BACKGROUND OF THE INVENTION

1. Field of the Invention

The present invention relates to a communication apparatus, a method of controlling the same, and a storage medium.

2. Description of the Related Art

In recent years, among printing apparatuses, apparatuses such as multi function peripherals and printers, having a wireless LAN function are increasing. It is common for printing apparatuses having wireless LAN to be provided with a function for connecting wirelessly to an access point as a client. Meanwhile, PCs and mobile terminals are being used for device management in which they communicate with a printing apparatus via an access point, causing the printing apparatus to print desired data by transmitting it, and receiving device information from the printing apparatus.

Meanwhile, in recent years, Wi-Fi Direct (registered trademark) (hereinafter referred to as Wi-Fi Direct) has been established by the Wi-Fi Alliance. With Wi-Fi Direct, a protocol is defined in which it is determined whether wireless terminals will operate as an access point or as a client. By executing this protocol, it can be automatically decided which wireless terminal will be an access point, and which will be a client. By using Wi-Fi Direct, it becomes unnecessary to prepare an access point separately, and various application services (image sharing, printing, etc.) are executable by direct communication between the wireless terminals.

With printing apparatuses in which the above described protocol is executable, configuration may be taken so that a user can instruct from a control panel, or the like, whether to perform direct wireless communication using Wi-Fi Direct, or whether to perform wireless communication indirectly via a third party access point.

With Japanese Patent Laid-Open No. 2011-160463, a printing apparatus can use a SEND function for transmitting, to an external apparatus, image data of originals that the printing apparatus scanned. Displaying an address book for identifying an address to which to send the image data with the SEND function, and a user selecting an address from the address book is recited.

The conventional SEND function was provided to users with the presumption of communication using a wired LAN or wireless communication in which the communication is performed via an access point which is a third party. Accordingly, it is not considered that how the SEND function is provided to the user in a network in which an apparatus and another apparatus execute direct wireless communication using Wi-Fi Direct.

SUMMARY OF THE INVENTION

An aspect of the present invention is to eliminate the above-mentioned problems with the conventional techniques.

A feature of the present invention is to provide a technique of improving user convenience in using a SEND function in a network in which an apparatus and another apparatus execute direct wireless communication, for example, using Wi-Fi Direct.

According to an aspect of the present invention, there is provided a communication apparatus operable to perform communication with a communication terminal, comprising: a display unit configured to display an address book storing a plurality of addresses; a wireless communication unit configured to perform communication in a wireless communication mode for communicating wirelessly with a communication terminal, either the communication terminal or the communication apparatus having become an access point; a determination unit configured to determine, when a transmission is instructed, whether or not communication in the wireless communication mode by the wireless communication unit is in progress; and a setting unit configured to set, in a case that it is determined by the determination unit that the communication by the wireless communication unit is in progress, an address of the transmission to a partner of the communication that is in progress by making a use of the address book invalid.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention.

Figure 1A:
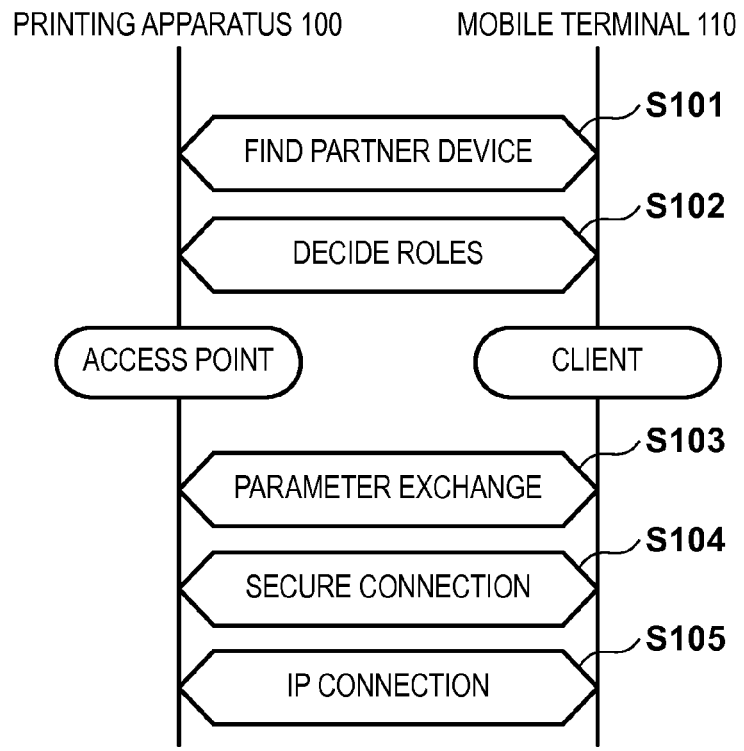
FIG. 1A depicts a view for explaining a Wi-Fi Direct processing sequence.

FIG. 1A depicts a view for explaining a Wi-Fi Direct processing sequence.

Here, both a printing apparatus 100 and a mobile terminal 110 support Wi-Fi Direct.

The printing apparatus 100 and the mobile terminal 110 firstly, in step S101, search to determine whether or not any other communication terminal trying to make a wireless connection by Wi-Fi Direct in their surroundings exists, and they find each other. When the partners find each other, they determine, in step S102, which will become the access point (GroupOwner), and which will become the client (Client).

Here, the result of the role deciding is that the printing apparatus 100 will be the access point and the mobile terminal 110 will be the client.

Next, in step S103, using WPS (Wi-Fi Protected Setup), parameters for wireless connection are provided from the printing apparatus 100 which is the access point to the mobile terminal 110 which is the client. Then, in step S104, using these parameters, a wireless connection is made between the printing apparatus 100 and the mobile terminal 110. When the wireless connection is established in this way, addressing is performed, in step S105, for IP communication between the printing apparatus 100 and the mobile terminal 110. Here, the printing apparatus 100, which is the access point, performs the role of a DHCP server, and grants a predetermined IP address to the mobile terminal 110, which is the client.

This is the basic sequence of Wi-Fi Direct. By executing this sequence, direct communication between an application service loaded in the printing apparatus 100, and an application service loaded in the mobile terminal 110 is possible.

Figure 1B:
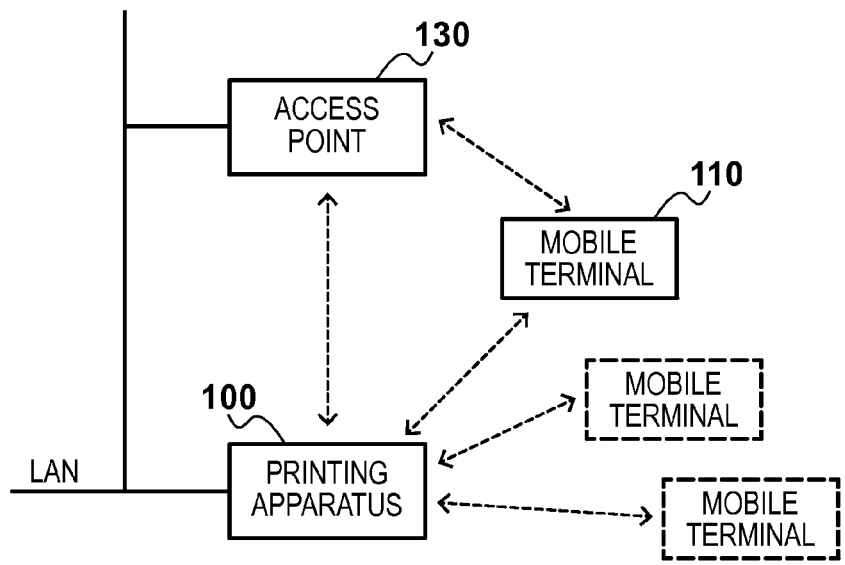
FIG. 1B depicts a view for showing a configuration of the communication system according to embodiments.

FIG. 1B depicts a view for showing a configuration of the communication system according to embodiments.

In the system, the printing apparatus 100 performs wireless communication with a mobile terminal 110 via an access point 130. Also as explained with FIG. 1A, the printing apparatus 100 can communicate with the mobile terminal 110 in a Wi-Fi Direct mode. Furthermore, in a case where the printing apparatus 100 becomes an access point in the Wi-Fi Direct mode and functions as a DHCP server, multiple mobile terminals, which are clients, can communicate in parallel with the printing apparatus 100.

Figure 2:
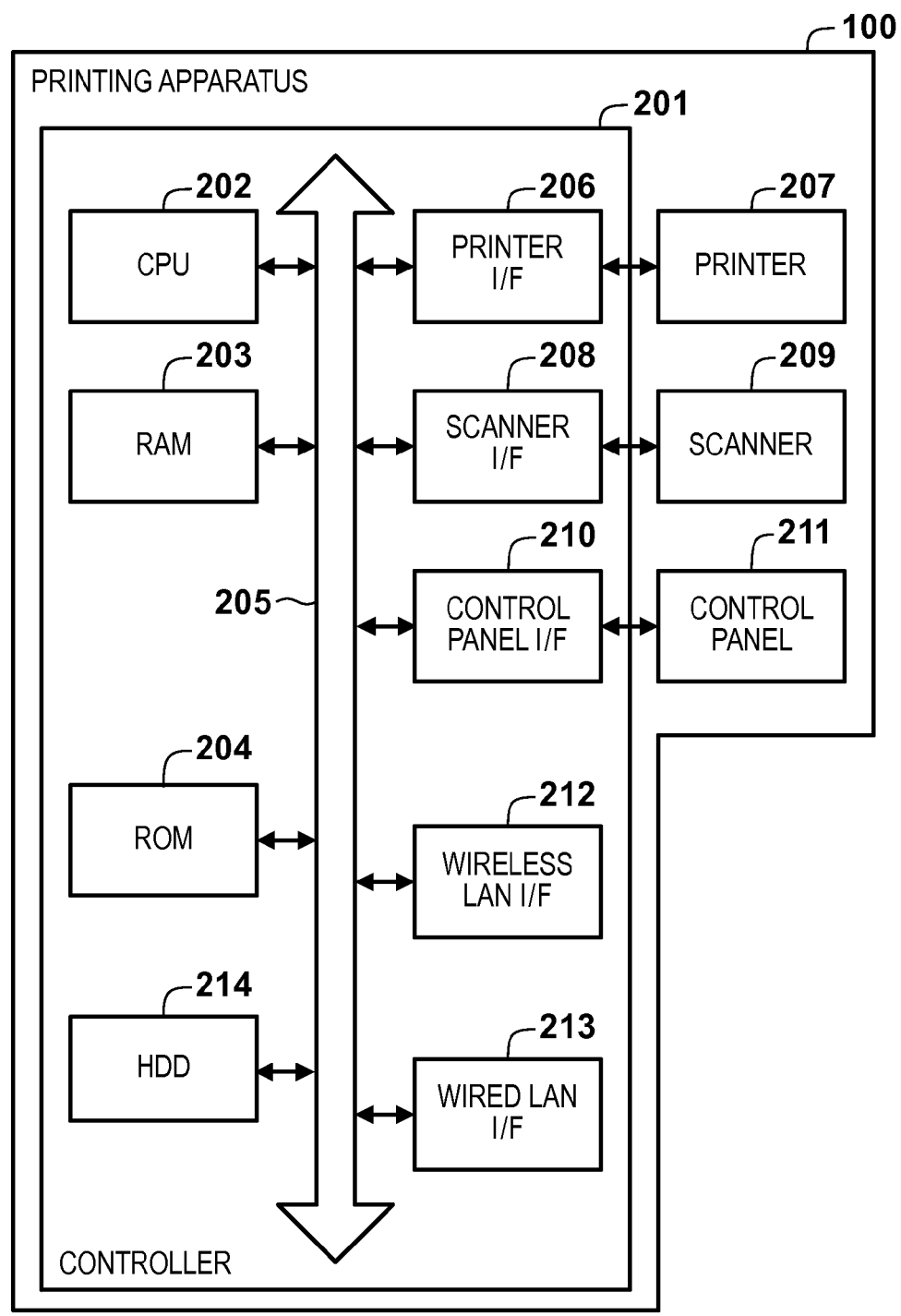
FIG. 2 is a block diagram for showing a hardware configuration of a printing apparatus according to embodiments of the present invention.

FIG. 2 is a block diagram for showing a hardware configuration of the printing apparatus 100 according to embodiments of the present invention.

A controller 201 including a CPU 202 controls operation of the printing apparatus 100 in general. The CPU 202 loads control programs stored in a ROM 204 or an HDD 214 into a RAM 203, and performs various control such as communication control by executing the programs. The RAM 203 is a main memory of the controller 201, and is used as a work area. The HDD 214 stores data, various programs, or various information tables. A printer I/F 206 is an interface for outputting image signals to a printer 207 (a printer engine). Also, a scanner I/F 208, is an interface that reads an original with a scanner 209 (a scanner engine) and inputs image signals obtained by reading the original. Upon a copy operation, the CPU 202 processes image signals input via the scanner I/F 208, and prints by outputting print data to the printer 207 via the printer I/F 206 as recording image signals. A control panel I/F 210 connects a control panel 211 and the controller 201. The control panel 211 is provided with a display unit having a touch panel function, a keyboard or the like. The configuration of the control panel 211 will be explained later with reference to FIG. 4.

A wireless LAN I/F 212 transmits information to external terminals such as the mobile terminal 110 wirelessly, or receives various information from external apparatuses. A wired LAN I/F 213 transmits information by a wired LAN (Ethernet (registered trademark)) to external terminals (not shown), or receives various information from external apparatuses. The blocks in the controller 201 are connected to each other by a system bus 205.

Figure 3:
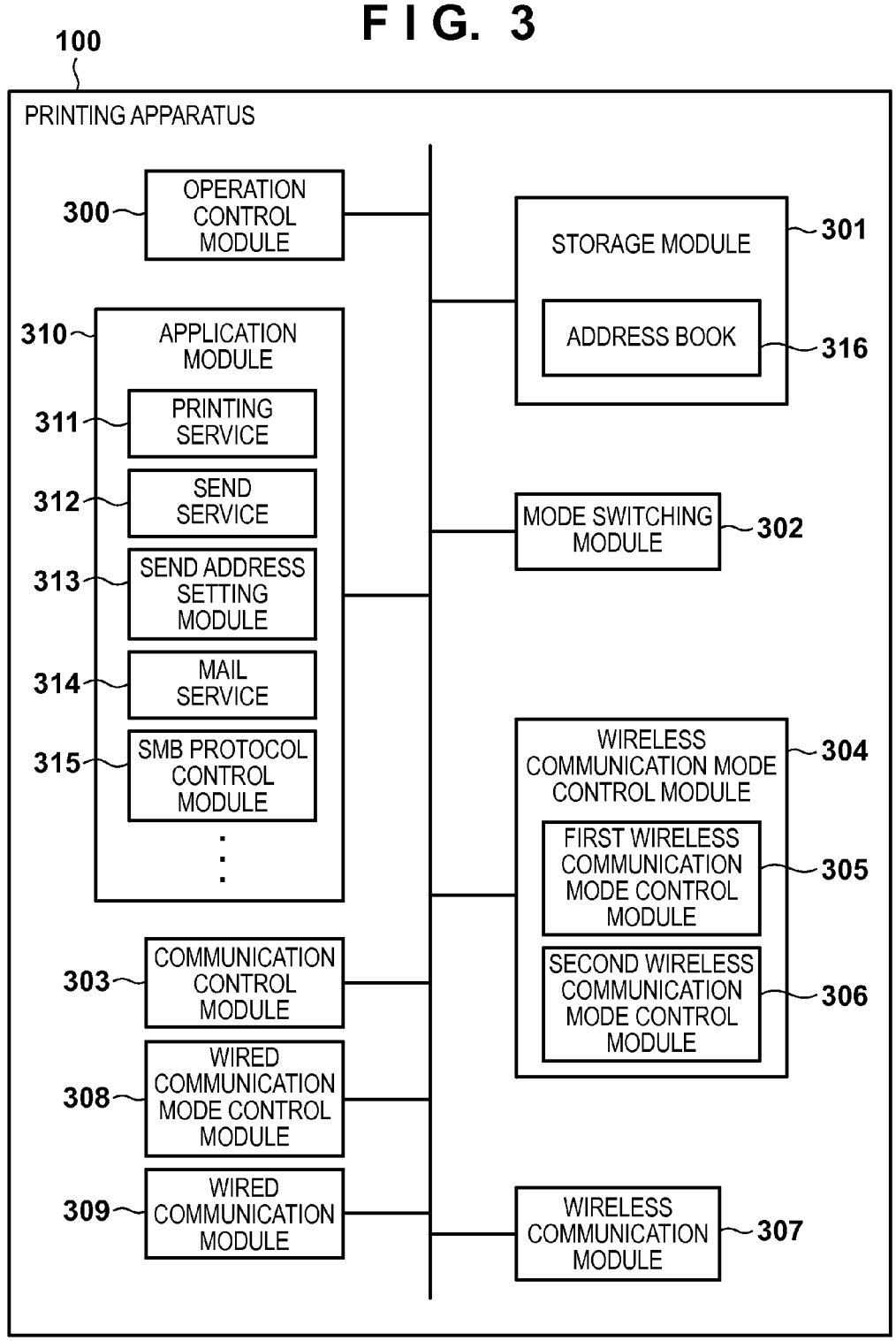
FIG. 3 is a functional block diagram for explaining a software configuration of the printing apparatus according to embodiments.

FIG. 3 is a functional block diagram for explaining a software configuration of the printing apparatus 100 according to embodiments. Each functional unit shown in FIG. 3 is realized by the CPU 202 of the printing apparatus 100 executing a control program loaded into the RAM 203 from the ROM 204 or the HDD 214.

An operation control module 300 controls the control panel 211. The operation control module 300 displays an operation menu on the control panel 211, waits for instruction input from a user, notifies other functional units of the content of instructions received by the control panel 211, and displays on the control panel 211 the instruction results. A storage module 301 stores identified data into the RAM 203 or the HDD 214 according to an instruction from another module, or reads out data stored in the RAM 203 or the HDD 214. An example of the data that the storage module 301 manages is an address book 316 in which address information used when the printing apparatus 100 transmits data is stored.

A mode switching module 302 performs processing for switching of a communication mode of the printing apparatus 100. For communication modes, there exists a mode for performing communication by the wired LAN (wired mode), and a mode for performing communication by wireless LAN (wireless communication mode). In the wireless communication mode, there further exists a first wireless communication mode and a second wireless communication mode. The first wireless communication mode is a mode for performing wireless communication via the access point 130 when the printing apparatus 100 performs wireless communication with the server 120 or the mobile terminal 110. The second wireless communication mode is, for example, a mode for the printing apparatus 100 and the mobile terminal 110 directly performing direct wireless communication using the Wi-Fi Direct function. In the second wireless communication mode, when the printing apparatus 100 communicates with the mobile terminal 110, either one of the printing apparatus 100 and the mobile terminal 110 makes a wireless connection as the access point, and the other as the client, and they perform direct communication.

A communication control module 303 performs communication control when the printing apparatus 100 communicates with an external apparatus such as the mobile terminal 110. Specifically, transmission data is sent out from an application module 310 over a network by passing it to a wireless communication module 307 or a wired communication module 309. Also, received data which is received via the wireless communication module 307 or the wired communication module 309 is passed to the application module 310.

A wireless communication mode control module 304 controls the wireless communication mode. The wireless communication mode control module 304 further includes a first wireless communication mode control module 305 and a second wireless communication mode control module 306. The first wireless communication mode control module 305 performs communication control when the printing apparatus 100 operates in the first wireless communication mode. The second wireless communication mode control module 306 performs communication control when the printing apparatus 100 operates in the second wireless communication mode (Wi-Fi Direct). The wireless communication module 307 controls the wireless LAN I/F 212 (FIG. 2) and, in a case where the printing apparatus 100 is operating in the wireless communication mode, performs data transmission and receiving when the application module 310 performing communication with an external apparatus such as the mobile terminal 110.

A wired communication mode control module 308 performs communication control in the wired mode. The wired communication module 309 controls the wired LAN I/F 213 and performs data transmission and receiving when the application module 310 performs communication with an external apparatus in a case where the printing apparatus 100 is operating in the wired mode.

The application module 310 has various services such as a printing service 311 and a SEND service 312. The printing service 311 receives, via the communication control module 303, print data received from the wireless communication module 307 or the wired communication module 309, and outputs the print data to the printer 207 via the printer I/F 206. The SEND service 312 passes scan data received via the scanner I/F 208 from the scanner 209 to the communication control module 303, and transmits with the wireless communication module 307 or the wired communication module 309. A SEND address setting module 313 controls address setting when scan data is transmitted by the SEND service 312. A mail service 314 is provided with an SMTP control module for performing transmission of mail, and a POP control module for receiving mail. The SMTP control module transmits mail data to be transmitted via the communication control module 303 from the wireless communication module 307 or the wired communication module 309 to the SMTP server. The POP control module transmits data of a request to receive a mail via the communication control module 303 from the wireless communication module 307 or the wired communication module 309 to a POP server. An SMB protocol control module 315 controls the protocol in a case where an SMB protocol is used for a transmission protocol when scan data is transmitted by the SEND service 312.

Note, in order to simultaneously operate two or more modes out of the wired communication mode and the first wireless communication mode and the second wireless communication mode, it is necessary for the application module 310 and the communication control module 303 to support simultaneous operation of multiple modes. However, there exist printing apparatuses for which the application module 310 or the communication control module 303 does not support simultaneous operation of multiple modes. In this kind of printing apparatus, the wired communication mode, the first wireless communication mode and the second wireless communication mode may operate exclusively only one communication mode at a time. In such a case, the user can select, via the control panel 211, which communication mode for the printing apparatus to operate in.

Figure 4:
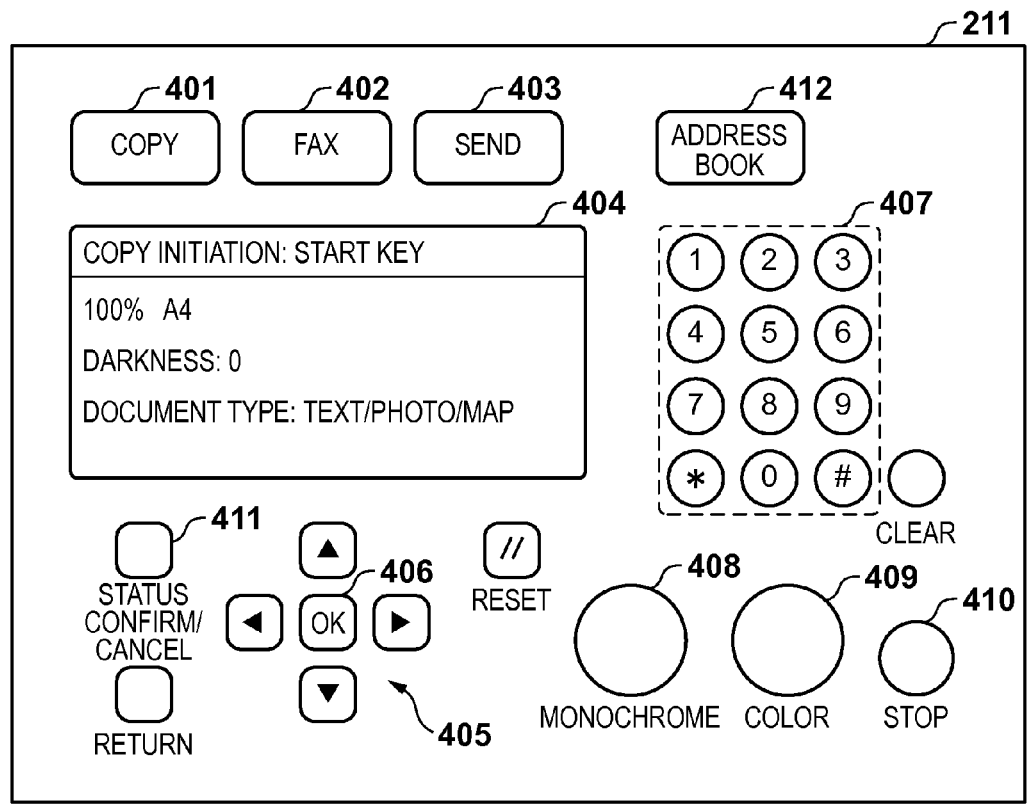
FIG. 4 depicts a top view of a control panel of the printing apparatus according embodiments.

FIG. 4 depicts a top view of the control panel 211 of the printing apparatus 100 according to embodiments.

The printing apparatus 100 according to embodiments has a scanning function with the scanner 209, a facsimile sending/receiving function and a copy function with the printer 207 and the scanner 209. In addition, there is a function for performing printing (a print) for which an instruction is received from an external apparatus such as the mobile terminal 110 by the wireless LAN I/F 212 or the wired LAN I/F 213.

Next, explanation will be given for the control panel 211. On the control panel 211, there are keys for selecting the above described functions (a copy button 401, a FAX button 402, and a SEND button 403), and the user presses the button of the function he or she wishes to use. Also, there is a display unit 404 for notifying the user of the setting status and the device status of the printing apparatus 100. Arrow keys 405 are used for movement of a cursor displayed on the display unit 404. On the arrow keys 405, there are four-direction buttons for up, down, left and right. In the center of the arrow keys, an OK key 406 is arranged, and this has a function as a "deciding key" corresponding to settings or queries. For example, in a case where the user wishes to change a copy setting (paper size), when the copy button 401 is pressed, a copy function screen is entered, the item that the user wishes to change (paper size) is selected with the arrows key 405, and the OK key 406 is pressed, transition is made to a selectable setting screen. The user can confirm the setting by moving the cursor to the position of the desired setting by operating the arrow keys 405 on the setting screen, and pressing the OK key 406. For numeric value input such as a number of copies, the user uses a numeric keypad 407.

There are a black and white start key 408 and a color start key 409 as keys for instructing a start of a copy or a scan. In the present embodiment, a color copy function is envisioned, and the color start key 409 is included in the figure. However, for printing apparatuses having only a monochrome scanning function or a monochrome print function, the black and white start key 408 may be the only start key. Furthermore, in printing apparatuses having a function by which it is possible to distinguish between a color original and a monochrome original when an original is scanned, embodiments are not limited to the start keys shown in FIG. 4, and there may be a single start key. A stop key 410 is a key for making an instruction for stopping the operation of various functions. Meanwhile, one way of stopping operation is that the user can stop processing by operating a status confirmation/cancel key 411, displaying a status confirmation screen for processing being performed on the printing apparatus 100, and selecting the processing the user wishes to abort on the status confirmation screen. In this case, the previously described arrow key 405 and the OK key 406 are used for selection/deciding. An address book button 412 is a button for instructing display of an address book for specifying a transmission destination upon the execution of a function such as a FAX, a SEND or the like, and by pressing this the address book is displayed on the display unit 404. Note, the previously described arrow key 405 and OK key 406 are used when a desired address is specified using the displayed address book.

First Embodiment

Next, explanation will be given for the first embodiment of the present invention.

In the first embodiment, the user can select a desired address from the address book in a case where it is not a Wi-Fi Direct connection (wired LAN or general wireless communication using an access point).

Meanwhile, upon a Wi-Fi Direct connection, when a SEND screen is displayed, the IP address of a connection partner (for example a mobile terminal) is automatically set as the address of the SEND function. Also, configuration is taken such that an address cannot be selected from the address book here (for example the address book is grayed out) in the Wi-Fi Direct connection.

Figure 5:
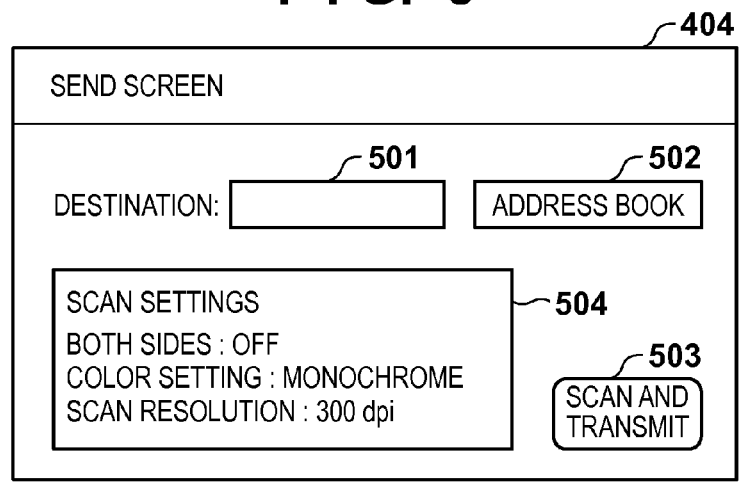
FIG. 5 depicts a view for showing an example of a screen of the printing apparatus on which a control panel is displayed according to a first embodiment.

FIG. 5 depicts a view for illustrating an example of a screen of the printing apparatus 100, which is displayed on the display unit 404 of the control panel 211 according to the first embodiment.

This screen is displayed upon the SEND button 403 of the control panel 211 shown in FIG. 4 being pressed. In FIG. 5, numeral 501 denotes an address input area for inputting an address which is a transmission destination and numeral 502 denotes a button for instructing the display of the address book. When the button 502 is pressed, a list of addresses stored in the address book 316 of the storage module 301 is displayed on the display unit 404.

A "scan and transmit" button 503 is a button for instructing that an original is scanned and transmitted in accordance with scan settings displayed in a display area 504. Note, the scan settings illustrate scan conditions of the scanner 209 set by the user via a menu screen of the SEND function (not shown). Scan image data obtained by scanning an original is transmitted to a specified address.

Figure 6:
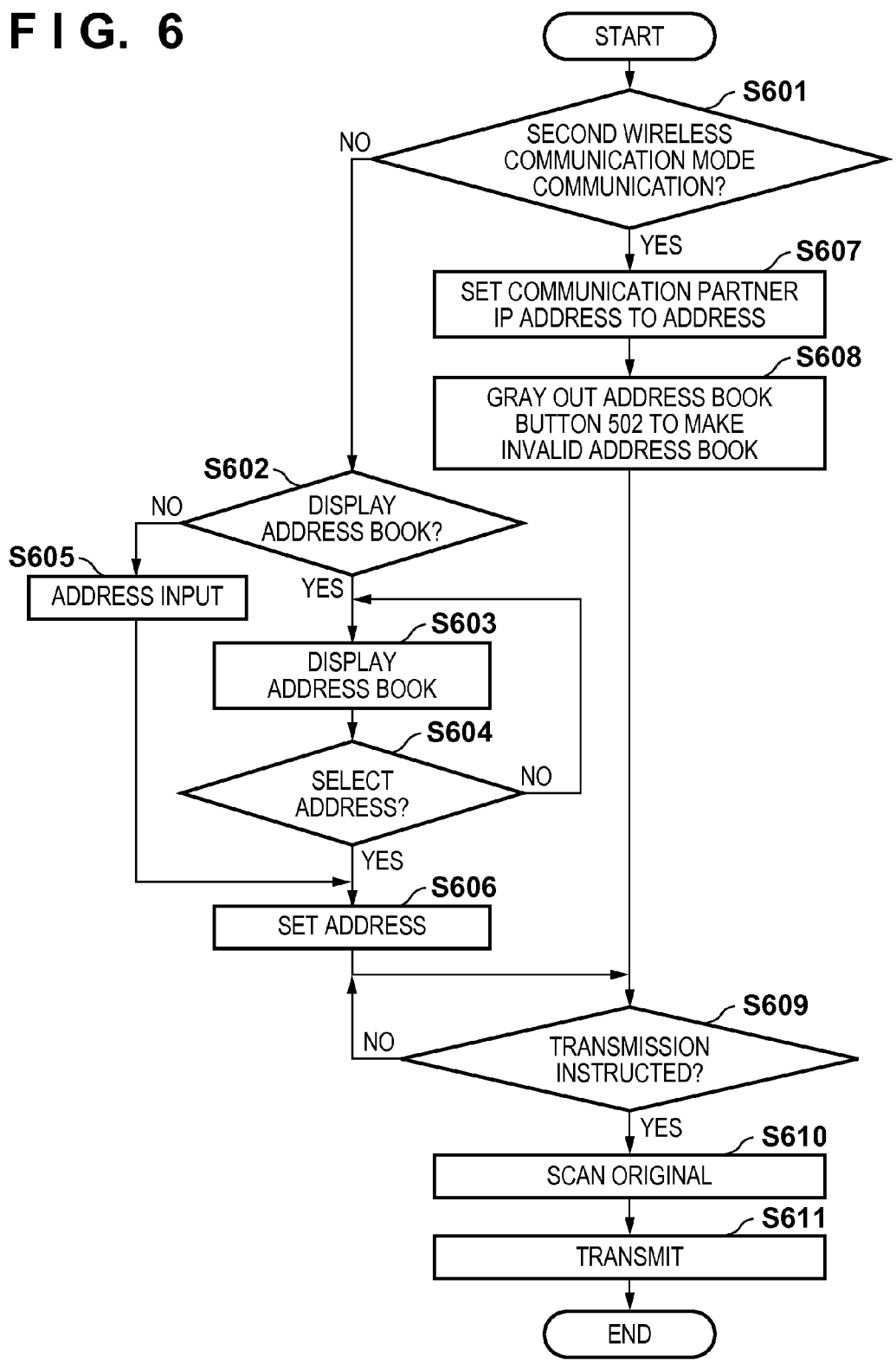
FIG. 6 is a flowchart for describing processing of a SEND function performed by the printing apparatus according to the first embodiment.

FIG. 6 is a flowchart for describing processing of a SEND function performed by the printing apparatus 100 according to the first embodiment. Note, the processing is realized by the CPU 202 executing a program loaded into the RAM 203 from the HDD 214 or the ROM 204 upon execution.

The processing shown in the flowchart of FIG. 6 is initiated by the user pressing the SEND button 403 on the screen of FIG. 4 and displaying the screen of FIG. 5.

Firstly, in step S601, the CPU 202 determines whether or not communication is in process with the mobile terminal 110 in the second wireless communication mode, i.e. the Wi-Fi Direct mode. If it is determined that communication by the second wireless communication mode is not in progress, the processing proceeds to step S602, and the CPU 202 determines whether or not the address book button 502 on the screen of FIG. 5 is pressed. When it is determined in step S602 that the address book button 502 is pressed, the processing proceeds to step S603 and the CPU 202 reads out the address book 316 of the storage module 301 and displays a list of addresses stored in the address book 316 on the display unit 404. Then, in step S604, when the user operates the control panel 211 and selects a desired address, the processing proceeds to step S606, the CPU 202 sets the address to the selected address, and the processing proceeds to step S609. Meanwhile, when, in step S602, without specifying the address book button 502, the user directly inputs an address on the address input area 501, the processing proceeds to step S605, the address input by the user is received, and the processing proceeds to step S606.

Meanwhile, when, in step S601, the CPU 202 determines that communication with the mobile terminal 110 by the second wireless communication mode is in progress, the processing proceeds to step S607, an IP address of the mobile terminal 110 of the communication partner is set to the address input area 501 of the screen of FIG. 5, and the processing proceeds to step S608. In a case of the second wireless communication mode, i.e. the Wi-Fi Direct mode, the communication partner of the printing apparatus 100 is specified to be the mobile terminal 110. In other words, it can be considered that the user is trying to transmit image data to the mobile terminal 110 using the SEND function. So, in the present embodiment, the effort of the user setting (inputting) the address can be eliminated by setting the IP address of the mobile terminal 110 to the address input area 501 automatically in step S607.

In step S608, the CPU 202 makes it so that the address cannot be selected from the address book by displaying (restricting the display) the address book button 502 to be grayed out in the screen of FIG. 5. Note, here, the address book button 412 of the control panel 211 is also made to be invalid, and operations on the address book button 412 are not received. This is in order to prevent the user from setting an erroneous address from the address book since it can be considered the case that upon communication by Wi-Fi Direct and since the user is trying to transmit a scan image to the mobile terminal 110 of the communication partner, the address book is made to be unusable.

Also, in the present embodiment, as explained above, the wired communication mode, the first wireless communication mode, and the second wireless communication mode are mutually exclusive. In other words, the printing apparatus 100 can only execute one communication mode, and cannot execute multiple communication modes simultaneously. In cases of the second wireless communication mode, i.e. the Wi-Fi Direct mode, even if an address is selected from the address book, the image data cannot be transmitted to the selected address. In the present embodiment, by making unusable the address book in step S608, the unnecessary setting of the address by the user can be prevented.

When the address is set, the processing proceeds to step S609, the CPU 202 determines whether or not the "scan and transmit" button 503 is pressed, and when it determines that the button 503 is pressed, the CPU 202 advances the processing to step S610. In step S610, the CPU 202 scans an original by controlling the scanner 209. Then, the processing proceeds to step S611, and the CPU 202 transmits the image data of the original obtained by the scanning to an address set in step S606 or in step S607.

Note, any one of step S607 and step S608 may be executed first.

By the first embodiment, as explained above, when a SEND function is instructed during communication in the Wi-Fi Direct mode, the IP address of the communication terminal (for example, mobile terminal 110) of the connection partner is automatically set as the address of the SEND function. Also, here, by making it so that the address cannot be set using the address book, there is the effect that the user setting an erroneous address from the address book can be prevented.

Second Embodiment

Next, explanation will be given for the second embodiment of the present invention. In the second embodiment, a user is allowed to select a desired mobile terminal on a SEND screen in cases of Wi-Fi Direct and cases where a plurality of mobile terminals are connected by Wi-Fi Direct. Then, the addresses corresponding to the selected mobile terminals are automatically set. Other than this, it is the same as the first embodiment. Note, because constituent elements such as the printing apparatus 100 according to the second embodiment are the same as in the previously described first embodiment, their explanation will be omitted.

Figure 7:
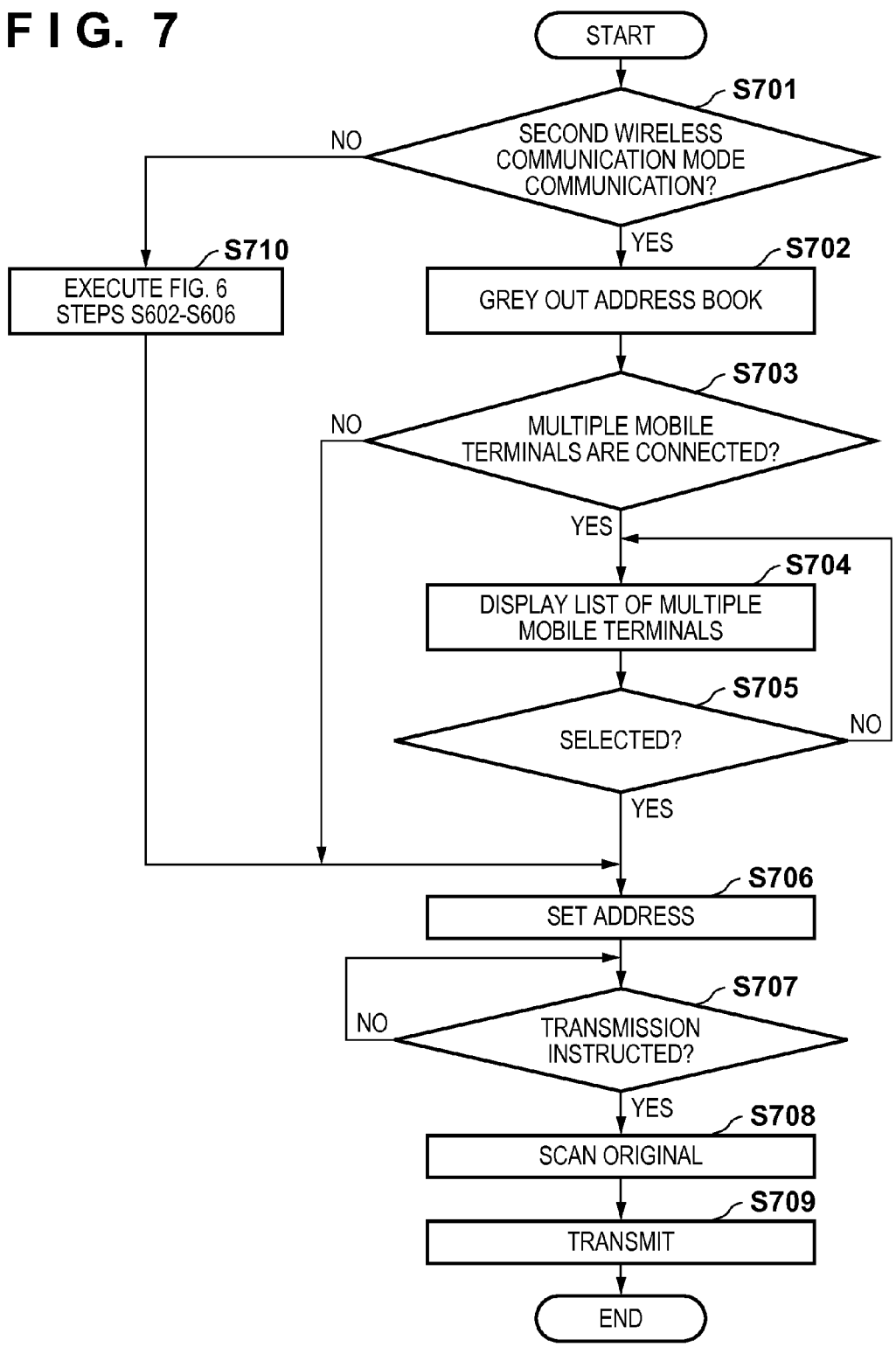
FIG. 7 is a flowchart for describing processing of the SEND function performed by the printing apparatus according to the first embodiment.

FIG. 7 is a flowchart for describing processing of a SEND function performed by the printing apparatus 100 according to the second embodiment. Note, the processing is realized by the CPU 202 executing a program loaded into the RAM 203 from the HDD 214 or the ROM 204 upon execution.

The processing shown in the flowchart of FIG. 7 is initiated by the user pressing the SEND button 403 on the screen of FIG. 4 and displaying the screen of FIG. 5.

Firstly, in step S701, the CPU 202 determines whether or not communication is in process with the mobile terminal 110 in the second wireless communication mode, i.e. the Wi-Fi Direct mode. If it is determined that communication by the second wireless communication mode is not in progress, the CPU 202 advances the processing to step S710. In step S710, the CPU 202 executes the processing shown in steps S602-S606 of FIG. 6, and the processing proceeds to step S706. The explanation of this processing is omitted.

Meanwhile, if the CPU 202, in step S701, determines that communication by the second wireless communication mode is in progress, the processing proceeds to step S702, and it is made to be such that addresses cannot be selected from the address book by displaying the address book button 502 to be grayed out on the screen of FIG. 5. Also, the address book button 412 (FIG. 4) of the control panel 211 is made to be invalid. Next, the processing proceeds to step S703, and the CPU 202 determines whether or not there are multiple mobile terminals for which communication by the second wireless communication mode is in progress. If, in step S703, it is determined that communication is in progress with a plurality of mobile terminals, the processing proceeds to step S704, and identifier information such as user names of the plurality of mobile terminals is displayed in a list on the display unit 404. Then, when in step S705, the identifier information that the user selected from the list is acquired, the processing proceeds to step S706, and the IP address of the selected mobile terminal is set to the address. Meanwhile, if, in step S703, communication is not in progress with a plurality of mobile terminals, similarly to the previously described first embodiment, the IP address of the mobile terminal for which communication is in progress is set to the address in step S706.

From step S706 the processing proceeds to step S707, the CPU 202 determines whether or not the "scan and transmit" button 503 is pressed, and if it is determined that the button 503 is pressed in step S707, the CPU 202 moves the processing to step S708. In step S708, the CPU 202 scans an original to obtain image data of the original by controlling the scanner 209. Then, the processing proceeds to step S709, and the CPU 202 transmits the image data of the original obtained by the scanning, and transmits to the address set in step S706.

By the second embodiment, as explained above, when a SEND function is instructed during a Wi-Fi Direct connection, by making it so that addresses cannot be selected from the address book, there is the effect that the user setting an erroneous address from the address book can be prevented. Also, when there are multiple mobile terminals for which communication by the second wireless communication mode is in progress, the user can select a desired mobile terminal as the transmission destination from out of these.

Other Embodiments

In the above described embodiments, explanation is given with the example of Wi-Fi Direct used as the second wireless communication mode, but the present invention is not limited to Wi-Fi Direct. If an apparatus and another apparatus can execute direct wireless communication, other wireless communication can be applied as the second wireless communication mode.

Also, in the above described embodiments, an example in which an IP address is used an address of the image data is explained, but other information may be used as the address.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-052430, filed Mar. 14, 2013, which is hereby incorporated by reference herein in its entirety.

What is claimed is:

1. A communication apparatus operable to perform communication with a communication terminal, comprising:
   a display unit configured to display an address book storing a plurality of addresses;
   a wireless communication unit configured to perform communication in a wireless communication mode for communicating wirelessly with a communication terminal, either the communication terminal or the communication apparatus having become an access point;
   a determination unit configured to determine, when making use of a transmission function is designated by a user, whether or not communication in the wireless communication mode by the wireless communication unit is in progress; and
   a setting unit configured to set, in a case that it is determined by the determination unit that the communication by the wireless communication unit is in progress, an address of the transmission to a partner of the communication that is in progress by making a use of the address book invalid.

2. The communication apparatus according to claim 1, wherein the wireless communication mode is a communication mode for communicating by Wi-Fi Direct.

3. The communication apparatus according to claim 1, wherein the setting unit sets an IP address of a partner of the communication that is in progress acquired by the wireless communication mode as the address of the transmission.

4. The communication apparatus according to claim 1, further comprising:
   a unit for determining whether or not there are multiple communication terminals for which communication in the wireless communication mode by the wireless communication unit is in progress; and
   a list display unit configured to display, in a case where there are a plurality of communication terminals of the communication that is in progress, identifier information of the plurality of communication terminals in a list,
   wherein the setting unit sets an address of a communication terminal corresponding to identifier information that a user selects from the identifier information of the plurality of communication terminals displayed by the list display unit to the address of the transmission.

5. A non-transitory computer-readable storage medium storing a program for causing a computer to function as the communication apparatus according to claim 1.

6. The communication apparatus according to claim 1, wherein the communication apparatus is a printing apparatus.

7. The communication apparatus according to claim 1, further comprising:
   a reading unit configured to read a document,
   wherein the transmission function is a function in which image data is generated based on the document read by the reading unit and is transmitted.

8. A method of controlling a communication apparatus operable to perform communication with a communication terminal, comprising:
   a display step of displaying an address book storing a plurality of addresses;
   a wireless communication step of performing communication in a wireless communication mode for communicating wirelessly with a communication terminal, either the communication terminal or the communication apparatus having become an access point;

a determination step of determining, when making use of a transmission function is designated by a user, whether or not communication in the wireless communication step in the wireless communication mode is in progress; and a setting step of setting, in a case that it is determined in the determination step that communication in the wireless communication step is in progress, an address of the transmission to a partner of the communication that is in progress by making a use of the address book invalid.

9. A printing apparatus comprising:

a reading unit configured to read a document;

a display unit configured to display a transmission screen related to a transmission function in which image data is generated based on the document read by the reading unit and is transmitted; and a determination unit configured to determine whether or not the printing apparatus operates in a direct wireless communication mode in which the printing apparatus and an external apparatus perform direct wireless communication, wherein if it is determined by the determination unit that the printing apparatus operates in the direct wireless communication mode, a partner of the direct wireless communication is set as a destination of the image data.

10. The printing apparatus according to claim 9, wherein if it is determined by the determination unit that the printing apparatus operates in the direct wireless communication mode, the display unit displays the transmission screen in which a partner of the direct wireless communication is set as a destination of the image data.

11. The printing apparatus according to claim 9, wherein the determination unit determines whether or not the printing apparatus operates in the direct wireless communication mode upon receiving an instruction for displaying the transmission screen, and wherein if it is determined by the determination unit that the printing apparatus operates in the direct wireless communication mode, the display unit displays the transmission screen in which a partner of the direct wireless communication is set as a destination of the image data.

12. The printing apparatus according to claim 9, wherein if it is determined by the determination unit that the printing apparatus does not operate in the direct wireless communication mode, the display unit displays the transmission screen including a button for making uses of an address book, and wherein if it is determined by the determination unit that the printing apparatus operates in the direct wireless communication mode, making use of the address book is restricted.

13. The printing apparatus according to claim 9, wherein if it is determined by the determination unit that the printing apparatus does not operate in the direct wireless communication mode, the display unit displays the transmission screen including a button for making uses of an address book, and wherein if it is determined by the determination unit that the printing apparatus operates in the direct wireless communication mode, the display unit displays the transmission screen in which the button is displayed in an invalid state.

14. The printing apparatus according to claim 9, wherein if it is determined by the determination unit that the printing apparatus does not operate in the direct wireless communication mode and there are plural partners of the direct wireless communication, a partner selected by a user from the plural partners is set as the destination of the image data.

15. The printing apparatus according to claim 9, wherein if the printing apparatus operates in the direct wireless communication mode, either the printing apparatus or the external apparatus operates as an access point so that the printing apparatus and the external apparatus performs the direct wireless communication.

16. The printing apparatus according to claim 9, wherein when the printing apparatus operates in the direct wireless communication mode, the printing apparatus performs a wireless communication using Wi-Fi Direct with the external apparatus.

17. The printing apparatus according to claim 9, further comprising:

a transmitting unit configured to transmit the image data to the destination when an instruction for transmitting the image data is received from a user.

18. A method of controlling a printing apparatus having a reading unit for reading a document, the method comprising:

displaying a transmission screen related to a transmission function in which image data is generated based on the document read by the reading unit and is transmitted;

determining whether or not the printing apparatus operates in a direct wireless communication mode in which the printing apparatus and an external apparatus perform direct wireless communication; and setting a partner of the direct wireless communication as a destination of the image data, if it is determined in the determining that the printing apparatus operates in the direct wireless communication mode.

19. A non-transitory computer readable storage medium storing a program for causing a computer to execute a method of controlling a printing apparatus having a reading unit for reading a document, the method comprising:

displaying a transmission screen related to a transmission function in which image data is generated based on the document read by the reading unit and is transmitted;

determining whether or not the printing apparatus operates in a direct wireless communication mode in which the printing apparatus and an external apparatus perform direct wireless communication; and setting a partner of the direct wireless communication as a destination of the image data, if it is determined in the determining that the printing apparatus operates in the direct wireless communication mode.

* * * * *